United States Patent
Buntscheck et al.

(10) Patent No.: US 10,008,066 B2
(45) Date of Patent: Jun. 26, 2018

(54) METHOD AND APPARATUS FOR HANDLING VALUE DOCUMENTS

(71) Applicant: GIESECKE & DEVRIENT GMBH, München (DE)

(72) Inventors: Wilhelm Buntscheck, Wolfratshausen (DE); Markus Sperl, Garching (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 92 days.

(21) Appl. No.: 15/105,119

(22) PCT Filed: Dec. 12, 2014

(86) PCT No.: PCT/EP2014/003338
§ 371 (c)(1),
(2) Date: Jun. 16, 2016

(87) PCT Pub. No.: WO2015/090546
PCT Pub. Date: Jun. 25, 2015

(65) Prior Publication Data
US 2016/0314639 A1    Oct. 27, 2016

(30) Foreign Application Priority Data

Dec. 20, 2013   (DE) .................. 10 2013 021 976

(51) Int. Cl.
*G07D 7/04*   (2016.01)
*G07D 11/00*   (2006.01)
(Continued)

(52) U.S. Cl.
CPC ......... *G07D 11/0084* (2013.01); *B65G 57/00* (2013.01); *B65G 57/32* (2013.01);
(Continued)

(58) Field of Classification Search
CPC ............... G07D 11/00; G07D 11/0003; G07D 11/0006; G07D 11/0009; G07D 11/0012;
(Continued)

(56) References Cited

U.S. PATENT DOCUMENTS 4,465,192 A    8/1984   Ohba et al.
6,955,263 B2   10/2005  Steinkogler et al.
(Continued)

FOREIGN PATENT DOCUMENTS

DE    2760269 C2    3/1987
DE    10030221 A1   1/2002
(Continued)

OTHER PUBLICATIONS

German Search Report for corresponding German Application No. 102013021976.0, dated Nov. 26, 2014.
(Continued)

*Primary Examiner* — Jeffrey A Shapiro
(74) *Attorney, Agent, or Firm* — Workman Nydegger

(57) ABSTRACT

Input stacks of value documents are inserted in an input pocket of the value document processing apparatus, transported through the apparatus, checked and sorted into different deposit pockets of the value document processing apparatus, wherein reject value documents are deposited separately from the valid value documents. The reject value documents are automatically transported back to the input pocket with the aid of a reject transport device, to check the reject value documents again with the same value document processing apparatus (rerun). The reject transport device has several reject transport units, in which the reject value documents from the different input stacks are deposited separately from each other, and a reader for reading in the machine-readable identifier of the respective reject transport unit used for assigning the reject value documents of the
(Continued)

respective reject transport unit to the input stack to which these reject value documents belong.

16 Claims, 8 Drawing Sheets

(51) Int. Cl.

| | |
|---|---|
| B65H 33/14 | (2006.01) |
| B65H 33/18 | (2006.01) |
| B65H 33/16 | (2006.01) |
| B65G 57/00 | (2006.01) |
| B65G 57/32 | (2006.01) |
| B65G 61/00 | (2006.01) |
| B65H 29/40 | (2006.01) |
| B65H 31/24 | (2006.01) |
| B65H 31/30 | (2006.01) |
| B65H 83/02 | (2006.01) |
| B65H 1/26 | (2006.01) |
| B65H 1/30 | (2006.01) |
| B65H 5/00 | (2006.01) |

(52) U.S. Cl.
CPC ............ *B65G 61/00* (2013.01); *B65H 1/263* (2013.01); *B65H 1/30* (2013.01); *B65H 5/006* (2013.01); *B65H 29/40* (2013.01); *B65H 31/24* (2013.01); *B65H 31/3063* (2013.01); *B65H 33/14* (2013.01); *B65H 33/16* (2013.01); *B65H 33/18* (2013.01); *B65H 83/025* (2013.01); *G07D 11/0006* (2013.01); *G07D 11/0021* (2013.01); *B65H 2301/42264* (2013.01); *B65H 2405/3311* (2013.01); *B65H 2405/35* (2013.01)

(58) Field of Classification Search
CPC .......... G07D 11/0015; G07D 11/0021; G07D 11/0066; G07D 11/0084; B65H 1/263; B65H 1/30; B65H 5/006; B65H 31/24; B65H 31/3063; B65H 33/14; B65H 33/16; B65H 33/18; B65H 83/025; B65H 2301/42264; B65H 2405/3311; B65H 2405/35; B65H 29/00; B65H 29/38; B65H 31/00; B65H 31/30; B65H 83/30; B65H 83/02; B65H 1/00; B65H 1/26; B65H 39/00; B65H 1/28; B65H 5/00; B65H 5/002; B65H 83/00; B65H 2405/30; B65H 2405/33; B65H 2405/00; B65H 2301/4226; B65H 2301/422; B65H 2301/42; B65H 2301/40; B65H 2301/00; B65H 2301/4314; B65H 2701/1912; B65G 57/00; B65G 57/32; B65G 61/00; B65G 29/00

USPC .................. 194/206, 207; 209/534; 235/379
See application file for complete search history.

(56) References Cited

U.S. PATENT DOCUMENTS

| | | |
|---|---|---|
| 7,152,744 B2 | 12/2006 | Kunz et al. |
| 8,794,510 B2 | 8/2014 | Buchmann et al. |
| 2002/0040865 A1 | 4/2002 | Steinkogler et al. |
| 2002/0060421 A1* | 5/2002 | Kako ....................... B65H 7/02 271/259 |
| 2004/0225407 A1* | 11/2004 | Kunz ....................... G07D 7/00 700/213 |
| 2004/0254676 A1* | 12/2004 | Blust .................... G06Q 10/087 700/231 |
| 2011/0005982 A1* | 1/2011 | Sporer ............... G07D 11/0066 209/534 |
| 2012/0175217 A1 | 7/2012 | Demmeler |
| 2012/0197433 A1 | 8/2012 | Buchmann et al. |

FOREIGN PATENT DOCUMENTS

| | | |
|---|---|---|
| DE | 102009034065 A1 | 1/2011 |
| DE | 102009042891 A1 | 3/2011 |
| EP | 0871149 A1 | 10/1998 |
| EP | 1195725 A2 | 4/2002 |
| EP | 1833029 A1 | 9/2007 |
| EP | 2120219 A1 | 11/2009 |
| EP | 2355057 A1 | 8/2011 |

OTHER PUBLICATIONS

International Search Report for corresponding International PCT Application No. PCT/EP2014/003338, dated Mar. 16, 2015.

* cited by examiner

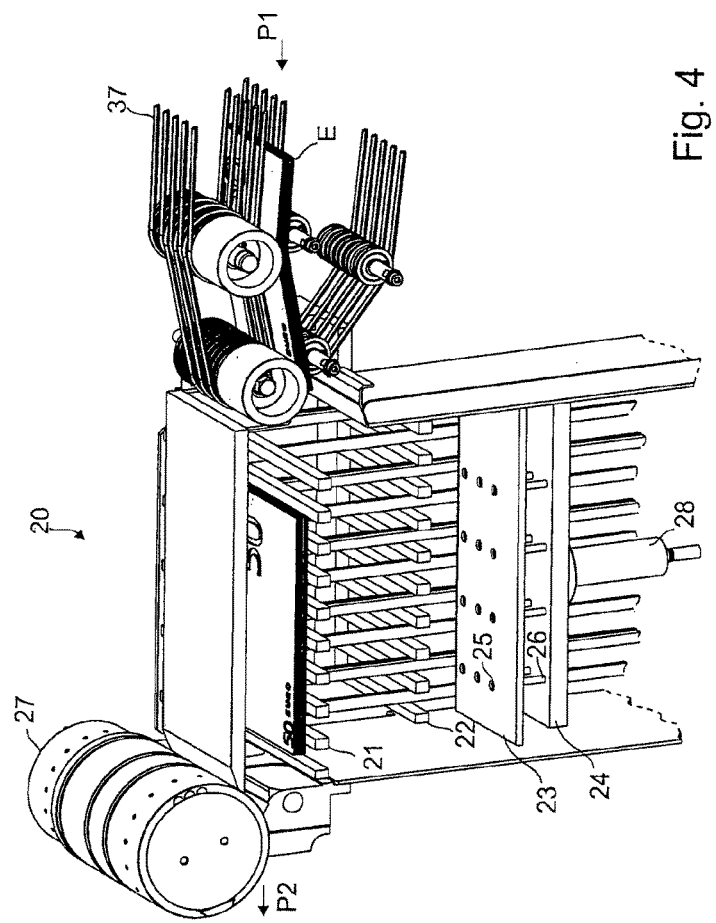
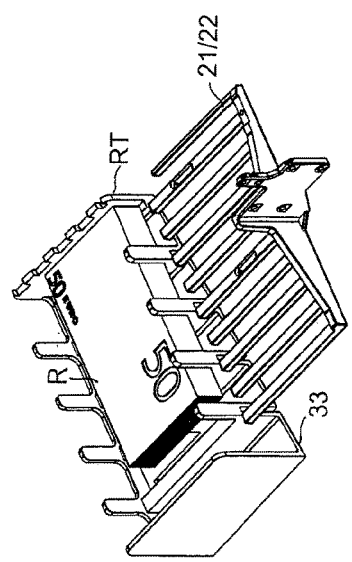
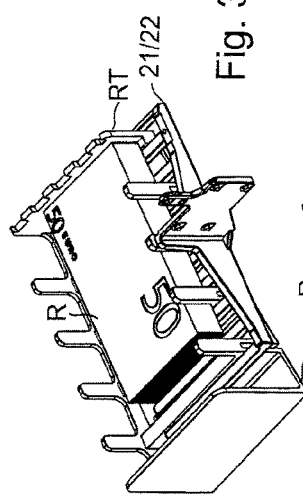
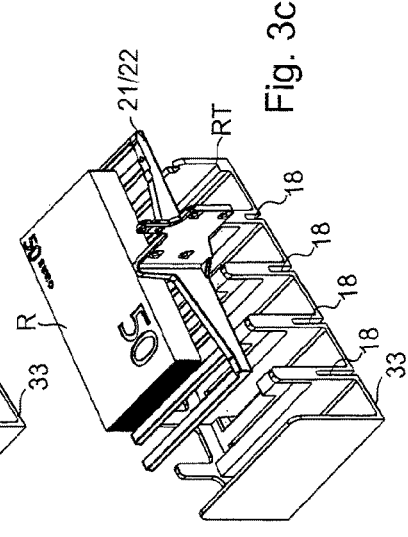

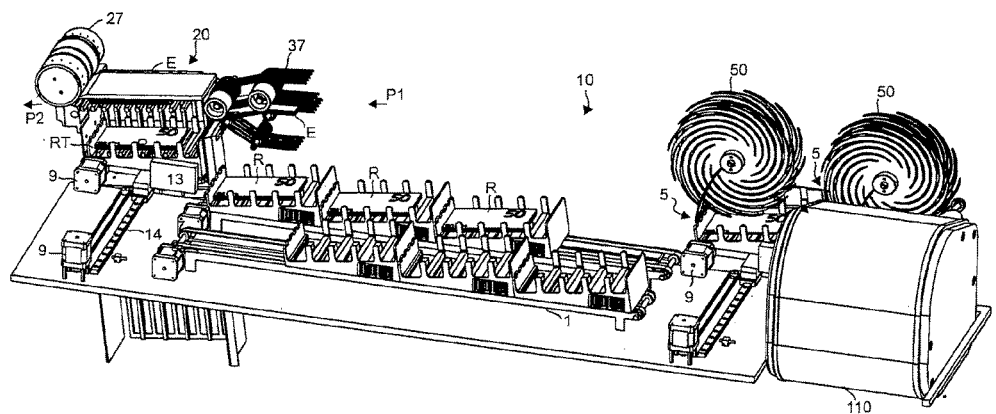
Fig. 5
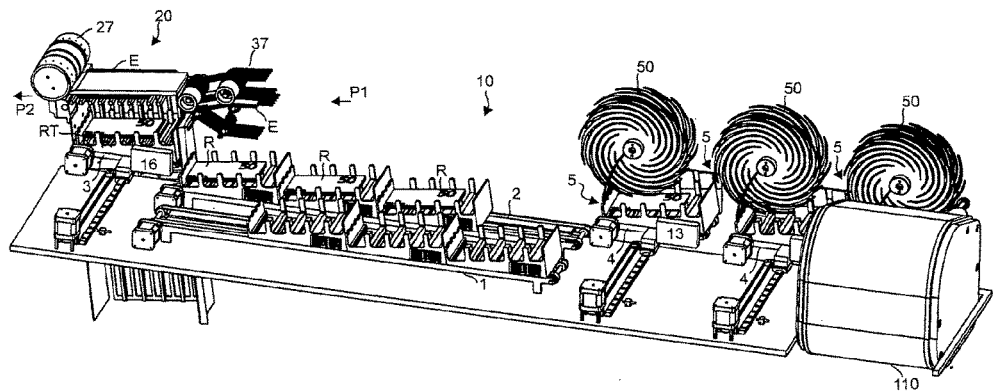
Fig. 6
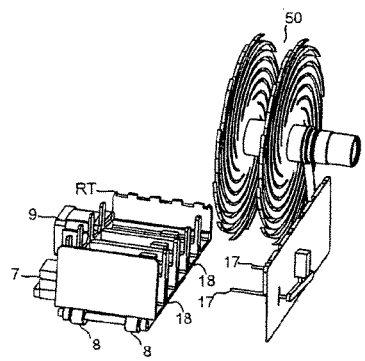 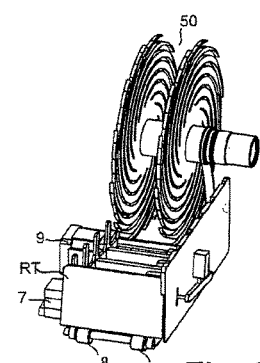 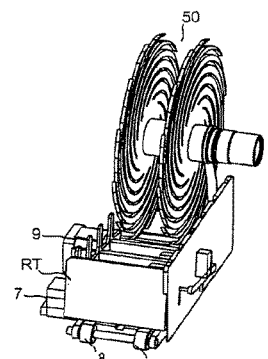
Fig. 8a　　Fig. 8b　　Fig. 8c

METHOD AND APPARATUS FOR HANDLING VALUE DOCUMENTS

BACKGROUND

The present invention relates to a method and an apparatus for processing value documents.

From DE 2760269 C2 an apparatus is known for automatically sorting value documents, which has an input pocket for receiving the value documents, a singling device, a transport system, a checking device arranged along the transport system and at least one deposit device. The value documents are sorted according to the results of the checking device, wherein indeterminable reject value documents are deposited or placed down in a temporary reservoir. From the check results of the reject value documents, a protocol is drawn up of the reject value documents. The protocol is used at a manual reworking station to manually evaluate and check the reject value documents removed from the temporary reservoir. The result of the manual check can be used to complete the sorting results. However, the known apparatus has the disadvantage that many reject value documents require a great effort of manual reworking at the manual reworking station.

To reduce the manual reworking, DE 10030221 A1 suggests to reduce the number of reject value documents to be manually reworked by repeating the check of the reject value documents. For this purpose, for example an automatic return of the reject value documents is provided to the input pocket of the apparatus, from which the reject value documents are singled again to carry out a further check by means of the same apparatus. The reduction of the number of reject value documents results, since any disturbances or faulty operating conditions present at the time of a first check of the value documents, e.g. skew or double removal of the value documents, usually no longer occur at the time of a second check of the reject value documents. The correct checking and assignment of the reject value documents is thus possible upon the second check (also referred to as rerun) in many cases.

It is a disadvantage, however, that separation cards are required for separating the reject value documents of different input stacks or settlement units, e.g. header cards and/or trailer cards, between which the reject value documents are deposited on the same stack. Using the information on the respective separation card, the respective reject value documents, after their rerun, are re-assigned to the original input packet to which the reject value documents belong, i.e. in which they were originally included. However, the use of separation cards represents an additional effort. Moreover, when separation cards are used, there is a risk with regard to a possibly incorrect assignment of reject value documents to the respective input stack/to the respective settlement unit, to which the reject value documents belong, e.g. in the case of a transport disturbance, in which the order of reject value documents and separation cards can get mixed up.

SUMMARY

When the reject value documents of several input packets, separated by separation cards, are stacked on top of each other, it is further required, when the reject value documents are returned to the input pocket of the apparatus, to turn over the stack thus formed of different reject value documents in order to be able to check them—in the rerun—in the original order of the input packets again. By turning over, the correct assignment of the rechecked reject value documents to the correct input packet can be achieved.

This object is achieved by the features of the independent claims. The dependent claims contain advantageous further developments of the invention.

To check one or several input stacks of value documents by means of a value document processing apparatus, these are manually or automatically inserted in an input pocket of the value document processing apparatus. Subsequently, the value documents from the input pocket are singled by a singling device of the value document processing apparatus, transported through the apparatus and checked by at least one sensor of the value document processing apparatus in the process, e.g. with regard to authenticity, type or the state of the value documents. In dependence on results of the check, the value documents are sorted into different deposit pockets of the value document processing apparatus. In this sorting, reject value documents are separated from the valid value documents and deposited in one or several reject deposit areas. Such value documents are referred to as reject value documents which are rejected and discarded in the automatic check of value documents by the value document processing apparatus, i.e. which are separated from the valid value documents. This can occur due to transport errors that can cause the respective value document not to be recognized upon automatic checking, or due to a suspicion of forgery of the respective value document.

Subsequently these reject value documents are automatically transported back from the respective reject deposit area to the input pocket of the value document processing apparatus with the aid of a reject transport device. The reject value documents of the different input stacks are deposited separately from each other in different reject transport units (RT) and transported back in the different reject transport units to the input pocket of the value document processing apparatus. Subsequently, individually for each reject transport unit, the reject value documents of the respective reject transport unit are automatically (re-)inserted in the input pocket to check the reject value documents again by means of the same value document processing apparatus (rerun). The respective reject value documents are then again singled from the input pocket, checked, transported and deposited. Through the rerun such value documents can be accepted as valid value documents that are no longer classified as reject in the rerun. Thus, the number of reject value documents can be reduced.

The reject transport device according to the invention has several reject transport units, in which the reject value documents of the different input stacks are deposited separately from each other, in order to transport them back separately from each other to the input pocket of the value document processing apparatus. The reject transport units each have an individual machine-readable identifier, such as a barcode or reflecting or mechanical coding elements or a data carrier, such as an NFC chip. For example, the reject transport units are configured as transport containers, which are open at the top.

The reject transport device has a reader for reading the machine-readable identifier of the respective reject transport unit. The machine-readable identifier of the respective reject transport unit read by the reader is used for assigning the reject value documents of the respective reject transport unit to the input stack to which these reject value documents belong, i.e. for assigning them to that input stack in which the reject value documents were originally fed to the value document processing apparatus (in which these were present upon initial insertion in the value document processing apparatus). This input stack forms a settlement unit of the value documents, for example. The input stack or the settlement unit can also consist of several partial stacks, which are fed to the value document processing apparatus consecutively.

The reader can be arranged at (e.g. below) the reject transport device such that the reject transport units are transported past the reader during the automatic transport of the reject value documents back to the input pocket, and the reader can read out (in contactless fashion) the machine-readable identifier during the transport past. The reader is preferably arranged on/in the reject transport device such that it can read out the machine-readable identifier of the respective reject transport unit while it is loaded with reject value documents in the reject deposit area. Additionally or alternatively, also a further reader can be used, which is arranged such that it can read out the machine-readable identifier of the respective reject transport unit immediately before the re-insertion of the reject value documents in the input pocket. Depending on the type of machine-readable identifier, the reader is e.g. a barcode reader, an NFC-enabled reader, The value document processing apparatus according to the invention comprises:
a) an input pocket for receiving one or several input stacks of value documents which are inserted in the input pocket,
b) a singling device for singling the value documents from the input pocket,
c) at least one sensor for checking the value documents,
d) a transport system for transporting value documents in dependence on results of the check and for sorting the value documents in different deposit pockets of the value document processing apparatus,
e) a reject transport device for automatically transporting reject value documents back from the reject deposit area to the input pocket, which has several reject transport units each having an individual machine-readable identifier, and a reader for reading the machine-readable identifier of the reject transport units,
f) a control device which controls the apparatus such that the reject value documents are deposited separately from the valid value documents in a reject deposit area, that the reject value documents are transported back from the reject deposit area to the input pocket and re-inserted in the input pocket, the reject value documents re-inserted in the input pocket are checked again by the apparatus, so that reject value documents that are no longer classified as reject in the rerun can be accepted as valid value documents. The control device controls the reject transport device such that the reject value documents of the different input stacks are deposited separately from each other in different reject transport units, and are transported back to the input pocket of the value document processing apparatus in the different reject transport units,
g) an evaluation device that uses the machine-readable identifier of the respective reject transport unit read by the reader for assigning the reject value documents from the respective transport unit to the input stack to which these reject value documents belong. The evaluation device can be configured separately from the control device of the apparatus or be integrated therein.

The evaluation device is configured e.g. to join the results of the rerun of the reject value documents which were no longer classified as reject in the rerun, but as valid value documents, with the results of the (initial) check of the input stack to which the respective reject value documents belong.

The check results of the rerun are assigned to the check results of the initial check of the respective input stack on the basis of the individual machine-readable identifier of the reject transport unit read by the reader.

It is achieved by the invention that the rerun of the reject value documents and the correct assignment of the reject value documents to their original input stack can be carried out fully automatically, without intervention by an operator. Moreover, it is no longer necessary that the rerun must be performed immediately after the initial check of the value documents. In contrast, the invention allows that the rerun can be effected with flexible timing.

One reject transport unit in each case is temporarily positioned in the reject deposit area of the value document processing apparatus with the aid of the reject transport device, the positioning being such that the reject value documents are deposited, particularly stacked, preferably directly (i.e. without prior stacking) from the value document processing apparatus in the reject transport unit.

The reject value documents of the reject transport units transported back to the input pocket are automatically re-inserted in the input pocket and the respective reject transport unit is emptied thereby. The emptied reject transport unit is transported back to a (the same or a different) reject deposit area with the aid of the reject transport device and is made available there for receiving reject value documents of a further input stack. It is used there to receive reject value documents that generally belong to a different input stack than the reject value documents removed just previously from the reject transport unit.

Preferably, the reject value documents of the reject transport units transported back to the input pocket are each re-inserted in the input pocket between two input stacks in such a fashion that an input stack is checked by the value document processing apparatus respectively immediately before and immediately after the check of the reject value documents of the respective transport unit, but the reject value documents of two different reject transport units are not checked in immediate succession. Accordingly, it is preferred not to have the value document processing apparatus process two reject stacks in immediate succession. Through the alternate processing with input stacks, a higher throughput of the processing of value documents can be achieved, since the processing of reject value documents of a transport unit (comprising much fewer value documents than the input stacks) is usually already finished before the reject value documents of the next transport unit can be inserted in the input pocket. The resulting waiting period can be avoided by intermediately effecting the processing of the input stacks requiring more time.

In the rerun of the reject value documents, a modified authenticity check of the reject value documents can be carried out, in which the reject value documents are checked for authenticity less strictly than in the initial check of the input stack in which the respective reject value documents were originally present. The number of reject value documents that are assessed as reject due to transport errors is reduced thereby. Preferably, in the rerun a less strict authenticity check is carried out only on the non-recognized value documents, which were separated from the value documents suspected of forgery upon sorting, wherein the non-recognized value documents were transported back to the input pocket and the value documents suspected of forgery were transported to a temporary reservoir. Since the initial check continues to be a strict check, value documents suspected of forgery are still found reliably and sorted out.

In one exemplary embodiment, one or several rakes is/are provided in the input pocket, which lift(s) the reject value documents from the respective reject transport unit and raise(s) them up to the singling device, so that the reject value documents are singled there again. The respective rake can be moved along the stacking direction of the value documents in the input pocket such that it can raise both the reject value documents from the reject transport unit and the input stacks inserted in the input pocket up to the singling device. The respective rake can also be movable along two directions, firstly in parallel to the stacking direction of the value documents in the input pocket and secondly perpendicularly thereto, along the fingers of the rake. The at least one rake is used as a separator, which mutually separates the value document stacks inserted in the input pocket. The apparatus detects the end of the respective value document stack (input stack or reject stack) on the basis of all value documents lying on the respective rake having been singled. Header cards and trailer cards can consequently be omitted.

The reject transport units each have e.g. a meandering bottom on which the reject value documents are placed, wherein the meandering bottom has elongated horizontal recesses (horizontal meaning parallel to the surface of the reject value documents). These recesses can be formed as depressions or through holes. The bottom is configured in such a meandering fashion on its upper side that the rake of the input pocket can dive into the meandering bottom (horizontally) and thereby under the reject value documents. The fingers of the rake therein comb with the recesses of the meandering bottom in order to raise the reject value documents lying on the bottom upwardly away from the bottom and thereby lift them out of the reject transport unit.

For re-inserting the reject value documents in the input pocket, one of the reject transport units is driven into the input pocket in each case, such that the rake of the input pocket dives into the recesses of the meandering bottom to lift the reject value documents from the respective reject transport unit and raise them up to the singling device. If the recesses are present as through holes, the reject transport unit (without the slide mentioned in the exemplary embodiments) can be automatically pushed into the input pocket and the rake moved along the stacking direction can dive through the bottom of the reject transport unit from below to raise the reject value documents. Alternatively, also the slide (mentioned in the exemplary embodiments) is moved along into the input pocket, if said slide likewise has corresponding recesses for the rake. Alternatively, first the reject transport unit can be driven into the input pocket on the slide and then a rake (movable along two directions) can be moved in the direction perpendicular to the stacking direction of the value documents, in order to dive into the bottom of the reject transport unit laterally (along the direction of its fingers). Alternatively, the diving can also be achieved with a rake which is movable only along the stacking direction and not perpendicularly thereto. For this purpose, even before the reject transport unit is driven into the input pocket with the slide, the rake is already moved to the appropriate level at which the recesses of the bottom of the reject transport unit will arrive. During the subsequent driving in of the reject transport unit into the input pocket, the (stationary) rake then dives into the bottom of the (oncoming) reject-transport unit.

Alternatively, for re-inserting the reject value documents transported back in the input pocket, a gripper can be used which removes the reject value documents from the respective reject transport unit and inserts them in the input pocket between two input stacks.

Alternatively, the re-insertion can also be achieved by pushing the reject value documents from their reject transport unit into the input pocket, e.g. with the aid of a slider. For this purpose, a rake or a vertically displaceable deposit plate of the input pocket is moved to the same level at which also the bottom of the reject transport unit is disposed, and then the reject value documents are pushed over horizontally from the bottom of the reject transport unit onto the rake/the deposit plate of the input pocket.

Preferably, the reject transport device has two transport paths, which are configured separately from each other, such that they allow a closed circulation of the reject transport units from the reject deposit area to the input pocket and back again. The empty reject transport units are transported along a first transport path from the region of the input pocket to the region of the reject deposit area and, after the reject value documents from the reject deposit area have been deposited in the respective reject transport unit, are transported back along a second transport path from the region of the reject deposit area to the region of the input pocket. The first and second transport path of the reject transport device can be moved independently of each other in such a fashion that for transporting the empty reject transport units along the first transport path (from the input pocket to the reject deposit area), a different point in time can be chosen than for transporting the loaded reject transport units back along the second transport path (from the reject deposit area to the input pocket). The first and second transport path can be straight, but can also include one or several deflection(s) or curve(s). The first transport path is formed e.g. by a first transport device, the second transport path by a second transport device. For example, the first and second transport device can have one or several conveyor belts and/or transport rollers.

Preferably, the first and second transport path form a buffer for several reject transport units, which can each receive reject transport units up to a maximum number. The first transport path forms a buffer for the empty reject transport units and the second transport path for the reject transport units loaded with reject value documents. For example, a stopping mechanism is present in each case at the end of the first/second transport path, by which the (empty/loaded) reject transport units can be stopped mechanically at the end of the first/second transport path. While the reject transport units are stopped mechanically at the end of the first/second transport path, further (empty/loaded) reject transport units can be fed at the start of the first/second transport path and transported along the first/second transport path until they collide with the reject transport unit at the end of the first/second transport path (stopped with the aid of the stopping mechanism). This permits collecting empty/loaded reject transport units at the end of the first/second transport path. By activating and deactivating the stopping mechanism disposed at the end of the first transport path, it is controlled when the next empty reject transport unit is transported to the reject deposit area. By activating and deactivating the stopping mechanism disposed at the end of the second transport path, it is controlled when the next reject transport unit loaded with reject value documents is transported to the input pocket.

In the exemplary embodiments the first and second transport path are in one plane, from the perspective of the operator of the apparatus practically one behind the other. However, the invention is not limited thereto. For it is equally possible to arrange the first and second transport path below one another, e.g. to save space to the front. However, the reject transport units would then also have to be transported vertically in order to get from the first to the second transport path and back.

The control device of the value document processing apparatus causes the re-insertion of the reject value documents in the input pocket preferably at the latest when the second transport path cannot receive any further reject transport units (loaded with reject value documents), and at the latest when no empty reject transport unit is present any more in the reject transport device for receiving reject value documents of a further input stack, depending on which event occurs first. In order to avoid a discontinuation of the value document processing, the re-insertion of the reject value documents in the input pocket should take place at a sufficiently early stage that there is always at least one further (empty) reject transport unit available for receiving reject value documents of the currently processed input stack. The re-insertion is carried out e.g. at or between the following two points in time:

1) The earliest possible time for re-inserting the reject value documents in the input pocket is as soon as the first reject transport unit loaded with reject value documents arrives at the input pocket. Once this has happened, the reject value documents of said transport unit can be inserted and processed at the earliest opportunity between two input stacks.
2) The latest possible time for re-inserting the reject value documents in the input pocket is when all the reject transport units of the reject transport device are loaded with reject value documents. At the latest when this is the case, it is determined that the processing of the current input stack, the value documents of which have just been singled this point, is finished, and that the reject value documents of at least one of the reject transport units transported back to the input pocket are automatically inserted in such a position in the input pocket that these are processed immediately after the current input stack, wherein the reject transport unit in question is emptied thereby. Since a certain time is needed for transporting this (just emptied) reject transport unit from the input pocket to the reject deposit area, and during this period no reject transport unit would be available for depositing reject value documents, it is preferred not to wait until the latest possible point in time, but to effect the re-insertion already earlier.

Preferably, the re-insertion of the reject value documents in the input pocket is caused at the latest when only one single empty reject transport unit is present in the reject transport device (i.e. at this time or earlier). The number of how many empty reject transport units are available can be ascertained for example on the basis of read machine-readable identifiers or by means of a camera and corresponding image processing. The re-insertion of the reject value documents in the input pocket can be caused e.g. when a certain minimum number of reject transport units is loaded with value documents, for example, when almost all are loaded and only a few or one single empty reject transport unit is present.

After processing an input stack, before the next input stack is processed by the value document processing apparatus, a change of the reject transport units is carried out. For this purpose, the reject transport device is moved such that the reject transport unit in which the reject value documents of that input stack were stacked which has just been processed, is moved out of the reject deposit area, and subsequently an empty reject transport unit is moved into the reject deposit area and made available there for receiving the reject value documents of the next input stack or one of the next input stacks.

If only one reject deposit area is available for receiving the reject transport units, the singling of a further input stack is postponed for such a time until a reject transport unit for receiving reject value documents has been made available again in this reject deposit area.

If more than one reject deposit area is available, the next (empty) reject transport unit can be moved already into (a different reject deposit area) before the previously loaded reject transport unit is moved out of its reject deposit area. The value document processing apparatus has e.g. two (equal) reject deposit areas that are used alternately for depositing reject value documents. Value document stacks inserted in the input pocket consecutively (input stack or reject stack), e.g. different consecutive input stacks of different settlement units, are deposited alternately in either the one or the other reject deposit area. The reject transport device is controlled such that at any given time of the value document processing, there is one reject transport unit available at least at one of the reject deposit areas for depositing reject value documents. It is thus achieved that also during the time while a reject transport unit loaded with reject value documents is transported out of one of the reject deposit areas and before an empty reject transport unit is transported into this reject deposit area again, a reject transport unit is available for depositing reject value documents in another reject deposit area. The value document processing then does not need to be interrupted. In this case there is no need to wait with the singling of the next input stack until the reject transport unit has been changed in the same reject deposit area. Since an empty reject transport unit for depositing reject value documents has already been made available in the other reject deposit area, the singling of the next value document stack in the input pocket can be started without waiting time.

BRIEF DESCRIPTION OF THE DRAWINGS

The invention will hereinafter be explained in more detail with reference to the figures. The figures are described as follows.

DETAILED DESCRIPTION OF VARIOUS EMBODIMENTS

Figure 1A:
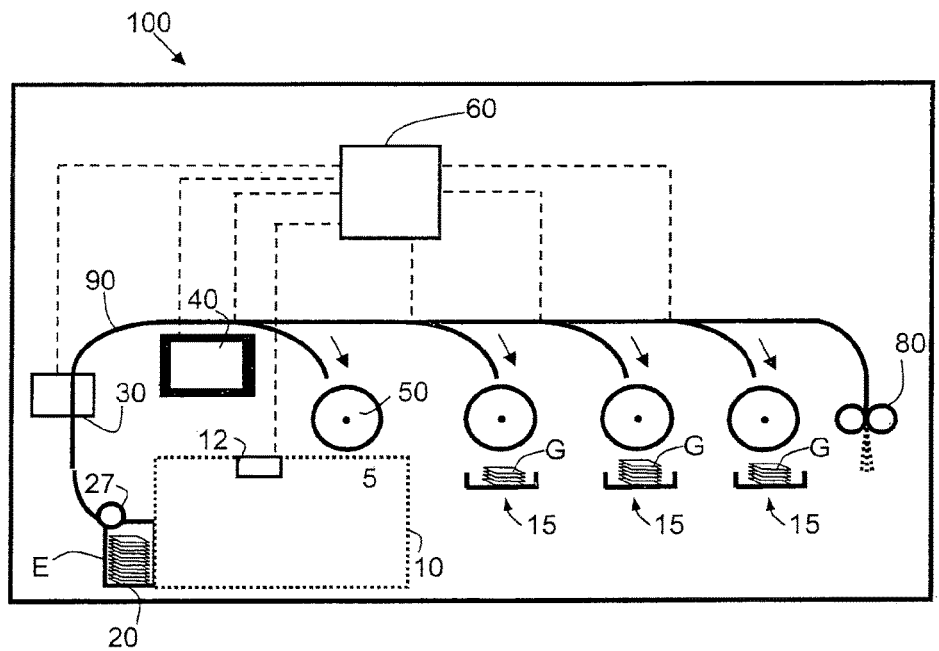
FIG. 1a a value document processing apparatus.

FIG. 1a shows a value document processing apparatus 100 having a reject transport device 10 according to the invention (examples of this represented in FIGS. 2, 5, 6, 7). One or several input stacks E of value documents were inserted in the input pocket 20 (automatically or manually), which are to be processed by the apparatus 100. At the upper end of the input pocket 20 there is a singling device 27, by means of which the topmost value document in the input pocket is singled in each case (along the arrow P2, see FIG. 4). The apparatus 100 has a transport system 90 that transports the value documents that are singled from the input pocket 20 past one or several sensors 30 and sorts them in accordance with the check results of the sensors 30. The checked value documents are deposited for sorting in one or several deposit pockets 15 for valid value documents G or, when a reject cause results from the check of the value document in question, in the reject deposit area 5. Where applicable, such value documents that are in a bad state can be destroyed by a shredder 80. The apparatus 100 can be operated via an operator interface 40. The control 60 of the apparatus 100 is connected to a transport control 12 of the reject transport device 10 by a communication line, via which the operation of the reject transport device 10 is coordinated in regard of the processing of the value documents in the apparatus 100, for example concerning the timing of the transporting of the reject transport units from the reject deposit area in dependence of when an input stack E has been processed and sorted or also concerning the transport of the next reject transport unit into the input pocket 20 in dependence of the progress of the processing of the input stack E by the apparatus 100. The tasks of the transport control 12 could alternatively also be taken over by the control device 60 itself.

Figure 1B:
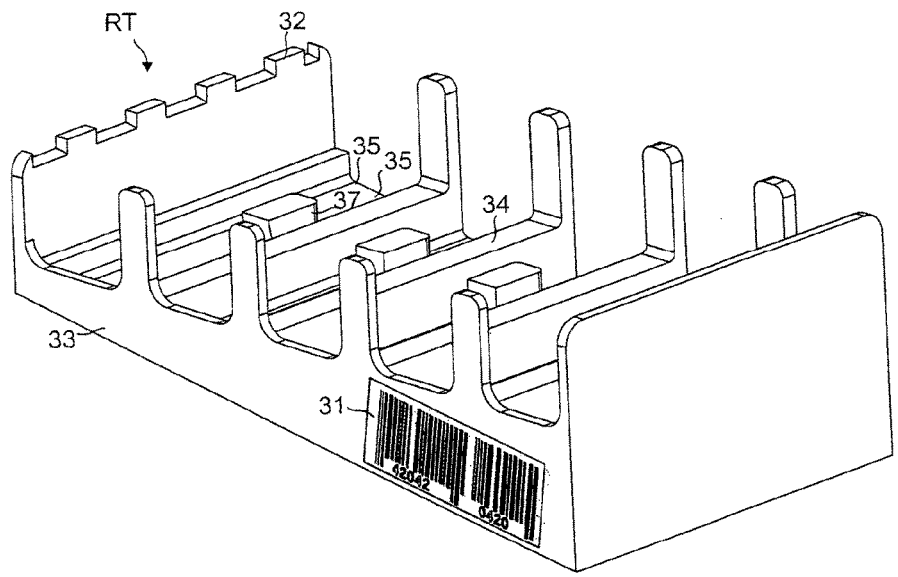
FIG. 1b an example of a reject transport unit.

In FIG. 1b an example of a reject transport unit (RT) is shown, which has a unique machine-readable identifier in the form of the barcode 31. The supporting surface on which the reject value documents rest in this example is inclined with reference to the bottom of the RT, to compensate a skewed position of the reject transport device 10. Since the reject value documents then rest on the ground such that their weight extends perpendicularly to the value document surface as far as possible, a slipping of the value documents from the RT is avoided. Alternatively, the supporting surface for the value documents can of course also be parallel to the bottom of the RT. The bottom of the RT shown in FIG. 1b has horizontal recesses 35, between which short supports 37 and long supports 34 are formed alternately, which form the support surface for the reject value documents. The space in front of and behind the short supports 37 facilitates manual insertion and removal of the reject value documents. The front side of the RT (left) has at its upper edge several steps 32 which, when the RT is disposed in the reject deposit area 5, supplement the stripper of the reject stacker wheel 50 (also supplied with corresponding steps) to form a flat surface, so that the value documents removed from the stack cannot get stuck anywhere upon stripping from the stacker 50, see FIG. 2.

Figure 2:
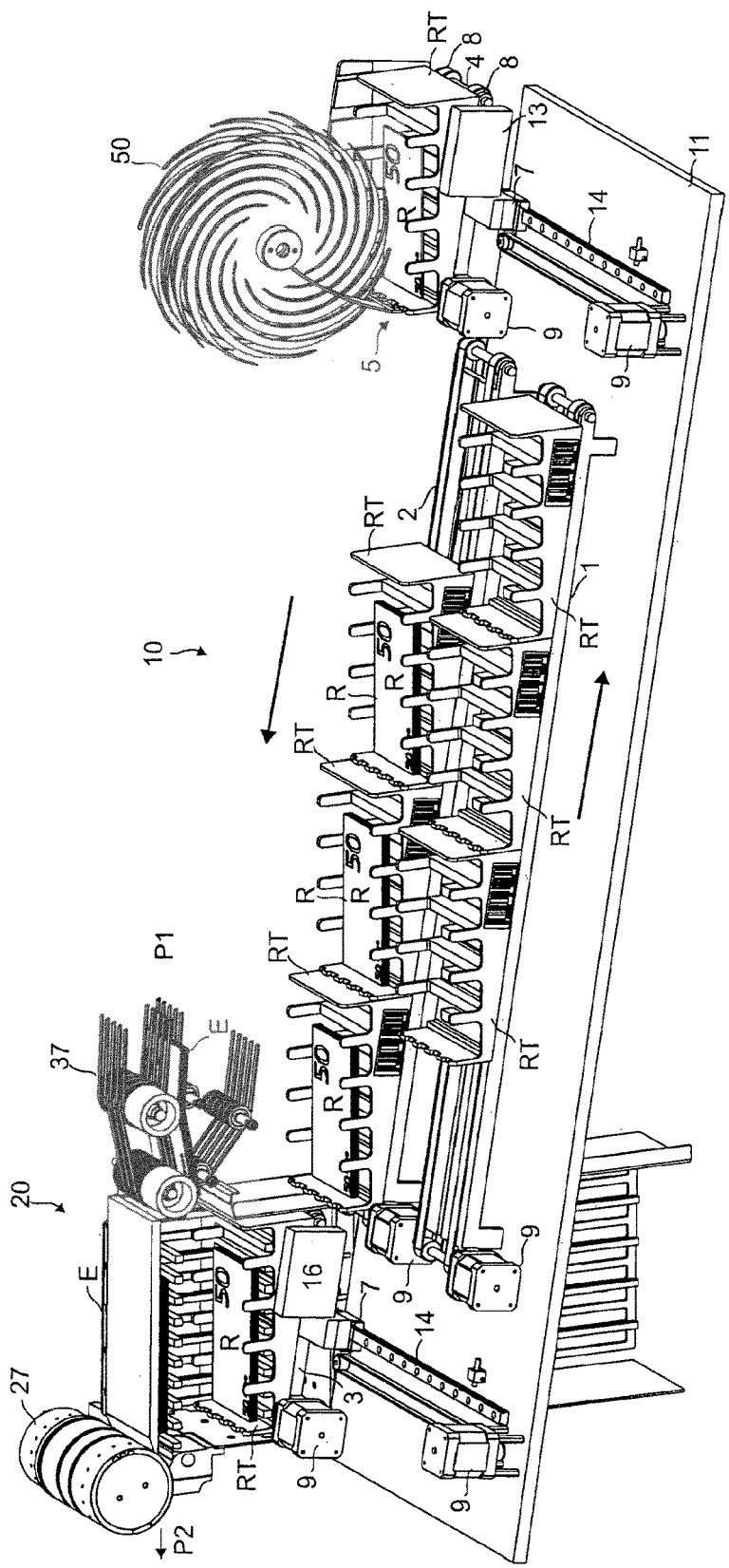
FIG. 2 a first exemplary embodiment of a reject transport device with only one reject deposit area, FIGS. 3a-c automatic removal of the reject value documents from the reject transport unit, FIG. 4 an input pocket of an apparatus according to the invention, FIG. 5 a second exemplary embodiment of a reject transport device with two reject deposit areas, FIG. 6 a third exemplary embodiment of a reject transport device with three reject deposit areas, FIGS. 7a-j a fourth exemplary embodiment of a reject transport device with two reject deposit areas, FIGS. 8a-c a lifting mechanism for the reject transport units in the reject deposit area.

FIG. 2 shows a first exemplary embodiment of the reject transport device 10 for the value document processing apparatus 100. Of the value document processing apparatus 100, in FIG. 2 only the input pocket 20 with the singling device 27 and the stacker wheel 50 of the reject deposit area 5 are represented. In the example shown, the reject transport device 10 has eight reject transport units RT. One RT is currently disposed in the reject deposit area 5 for depositing reject value documents of the currently singled input stack E. A further RT was just brought into the input pocket 20, so that the reject value documents disposed therein are again singled and checked by the apparatus 100, after the processing of the input stack E is finished. Three RTs, which are loaded with reject value documents of different input stacks are disposed on the transport path from the reject deposit area 5 to the input pocket 20 and three empty RTs on the transport path from the input pocket 20 to the reject deposit area 5. The transport control 12 controls the reject transport device 10 such that the reject transport units RT are temporarily positioned below a reject stacker wheel 50 of the value document processing apparatus 100, so that the reject value documents can be deposited by the reject stacker wheel 50 directly in the reject transport unit RT and stacked there. The singling out of the input pocket is only started as soon as an empty RT has been made available in the reject deposit area. An RT loaded with reject value documents is transported out of the reject deposit area only after the final value document of the input stack to be processed (or in case of a rerun of reject value documents the final value document of the reject stack in question) has been checked and deposited by the apparatus 100.

In the example shown, the first transport path of the transport device 10 has at least one first conveyor belt 1, which transports the empty transport units RT from the region of the input pocket 20 to the region of the reject deposit area 5. The second transport path of the reject transport device 10 has at least one second conveyor belt 2, which transports the reject transport units RT loaded with reject value documents R from the region of the reject deposit area 5 to the region of the input pocket 20. Further, the reject transport device 10 has a third conveyor belt 3 which takes over the reject transport units RT loaded with reject value documents R at the end of the second conveyor belt 2 and transports them into the input pocket 20, and transports the empty reject transport units out of the input pocket 20 and up to the start of the first conveyor belt 1, and a fourth conveyor belt 4, which takes over the empty reject transport units RT at the end of the first conveyor belt 1 and transports them to the reject deposit area 5, and transports the loaded reject transport units RT out of the reject deposit area 5 and up to the start of the second conveyor belt 2. Instead of the conveyor belts 1-4 also transport rollers can be used.

The conveyor belts 1-4 in this example each have two flat belts 8 extending in mutually parallel fashion, on which the RTs rest. For independently moving the conveyor belts 1-4, each conveyor belt has its own motor 9. In order to be able to move the RTs not only parallel to the direction of the flat belts, but also perpendicular to the direction of the flat belts, the two conveyor belts 3 and 4 can be displaced along the rail 14 by means of a slide 7. For this purpose e.g. a belt drive is used with a further motor 9.

In order to be able to distinguish the RTs from each other, the RTs are each provided with a machine-readable identifier, e.g. an individual barcode 31, see FIG. 1b. This barcode 31 is read with the aid of a barcode reader 13, which detects the machine-readable identifier of that RT which is currently disposed in the reject deposit area 5 to be loaded there with reject value documents. In the present example, the barcode reader 13 is mounted on the slide 7 of the conveyor belt 4. However, it can also be attached in stationary fashion in the reject deposit area 5 or thereunder. The barcode reader 13 reports the barcode 31 or the identifier determined therefrom (e.g. number) of the respective RT to the control device 60 (communication line not shown). If the number of RTs is intended to be variable, e.g. to be able to manually remove or add RTs from/to the reject transport device 10, a further barcode reader 16 should be provided to read the barcode (again) once the RT in question is disposed immediately in front of the input pocket 20. The second barcode reader 16 can be provided on the slide 7 of the conveyor belt 3, or also in the input pocket 20.

When the reject value documents are deposited in the reject deposit area 5, the barcode reader 13 detects the identifier of the respectively loaded RT and sends them to the control device 60, which also serves as evaluating device in the present example. Said device assigns the identifier of the respective RT to the respective input stack E, which is currently being processed by the apparatus and to which the reject value documents currently sorted into the reject deposit area 5 belong. The further barcode reader 16 detects the identifier of those RTs the reject value documents of which are re-inserted next in the input pocket 20 and likewise sends them to the control device 60. By comparing this RT identifier with the previously stored RT identifiers, the control device 60 then ascertains to which input stack E the RT transported into the input pocket 20 was previously assigned. The control 60 can determine thereby to which input stack E the reject value documents R of the RT disposed in the input pocket 20 belong. In this fashion, the re-processed reject value documents R can be assigned to the correct input stack E in which they were originally fed to the apparatus 100, even if one or more RTs were added or removed in the region of the second conveyor belt 2.

If such manual accesses can be ruled out, the number and order of the RTs on the reject transport device 10 is invariable and therefore the further barcode reader 16 is not necessary. The control 60 then counts of how many RTs that were transported back to the input pocket the reject value documents have already been transported into the input pocket 20 and rechecked. For example, the reject value documents of the first RT that arrives at the input pocket 20 are assigned to the input stack E that is processed first by the apparatus 100, those of the second RT to the second input stack, etc. When the same order of input stacks and RTs is complied with, thus the correct assignment of the respectively rechecked reject value documents to the associated input stack is possible.

Reject value documents which are transported back with the aid of an RT to the input pocket 20 and rechecked by the apparatus 100 are, for example, again deposited in a (different) RT. Since in this rerun generally some reject value documents are assessed as valid (e.g. if the reject reason was a transport error), the number of reject value documents is reduced by this rerun. The identifier of the corresponding RT in which the rechecked reject value documents are deposited is correspondingly connected with information that these are reject value documents to be checked again, and, if applicable, how many times these have already been subjected to a check by the apparatus 100.

FIGS. 3a-c shows an example of how the reject value documents R can be removed step by step automatically from the RT when the RT is disposed in the input pocket 20, here by a rake 21 or 22 of the input pocket (the remaining components of the input pocket 20 are omitted). The rake 21 and/or 22 can be moved along two directions, parallel to its fingers and perpendicularly to the value document plane. In FIG. 3a it is still disposed outside the RT, at a level between the lower side of the reject value documents R and the lower side of the bottom 33 of the RT. In FIG. 3b the rake 21 and/or 22 was inserted horizontally along its fingers below the reject value documents R into the bottom 33 of the RT, wherein the fingers of the rake dive into the recesses 35 of the RT. Subsequently the rake 21 and/or 22 is moved upward to raise the reject value documents from the RT up to the singler 27 of the input pocket 20, see FIG. 3c.

In FIG. 4 a possibility is represented for automatically feeding stacks of value documents to the input pocket 20 of the apparatus 100. The input pocket in this example has two rakes 21, 22 which are movable respectively along two directions (parallel to the fingers and perpendicularly to the value document plane). For feeding the input stacks E, these are conveyed with the aid of a stack transport device 37 along the arrow PI onto a deposit plate 23 of the input pocket. The control 60 coordinates the timing of the feeding of the input stacks E with the transport control 12 of the reject transport device 10. If necessary, the input stack E remains in a waiting position before it is pushed into the input pocket 20 by means of the stack transport device 37. After the deposit plate 23 was moved up by means of the motor 28 to just below the entrance position of the input stack E, the input stack E is pushed onto the deposit plate 23 by means of the stack transport device 37. Below the deposit plate 25 a pin plate 24 supplied with pins 26 is mounted, which can be driven as needed to the deposit plate 23 from below, to push the pins 26 through the holes 25 and to thus raise the value documents deposited on the deposit plate 23. One of the rakes 21, 22 of the input pocket can dive between the thus raised input stack E and the deposit plate 23 in order to lift the input stack upward from the pins 26 and convey it to the singling device, see also FIGS. 7c-f in this regard.

The control device 60 controls the feeding of the input stack E and the reject value documents R preferably such that, immediately before and after a reject stack, an input stack E is inserted in the input pocket. Alternatively to the shown stack transport device 37 it can also be provided, however, that the input stacks E are inserted in the input pocket 20 manually or by means of a gripper that inserts the input stacks E in the input pocket 20 on a deposit means (not shown) present below the reject transport device 10. This deposit means also has horizontal recesses into which the rakes 21, 22 can dive to raise the input stacks.

In a second exemplary embodiment, see FIG. 5, the value document processing apparatus has two reject deposit areas 5 for separately depositing reject value documents that are to be subjected to a rerun by the apparatus 100 on the one hand (left reject deposit area 5), and on the other hand of reject value documents that are not to be subjected to a rerun by the apparatus 100 (right reject deposit area 5). The reject value documents to be checked again of the left reject deposit area are deposited in an RT, transported back to the input pocket 20 thereby and re-inserted in the input pocket 20. The reject value documents not to be checked again are transported from the right reject deposit area into a temporary reservoir 110, from which they can be removed at a later time in order to check them again, in particular in order to check their authenticity more exactly. This temporary reservoir 110 can e.g. be removed from the apparatus 100 in order to carry out this rerun at a different apparatus.

It can be provided that the reject value documents transported back into the input pocket, when they are again assessed as reject value documents upon the rerun by the apparatus 100, are again deposited in the left reject deposit area and transported back to the input pocket to be checked again subsequently (twofold rerun). The rerun can also be effected several times (multiple rerun). However, it can also be provided that they are not transported back a second time to the input pocket after the rerun, but are brought to the temporary reservoir 110 in this case (simple rerun).

Upon sorting the value documents, the reject value documents of the respective input stack E can be divided into a first and a second reject category, for example, which are deposited in these different reject deposit areas. The first category includes, for example, the value documents which were not recognized in the initial check and the second reject category any possibly present value documents suspected of forgery. In particular, the reject value documents that are deposited in the RT and transported back to the input pocket 20 and re-inserted in the input pocket (rerun) are the reject value documents only of the first category (e.g. the non-recognized value documents). The reject value documents of the second category (suspected of forgery) are brought to the temporary reservoir 110 already in the first sorting process. In the temporary reservoir 110 those reject value documents of the second category (suspected of forgery) belonging to the same input stack, are stacked and deposited in the temporary reservoir 110 separately from the reject value documents of the second category (suspected of forgery) of other input stacks, so that they can be assigned to the correct input stack later.

Figure 7A:
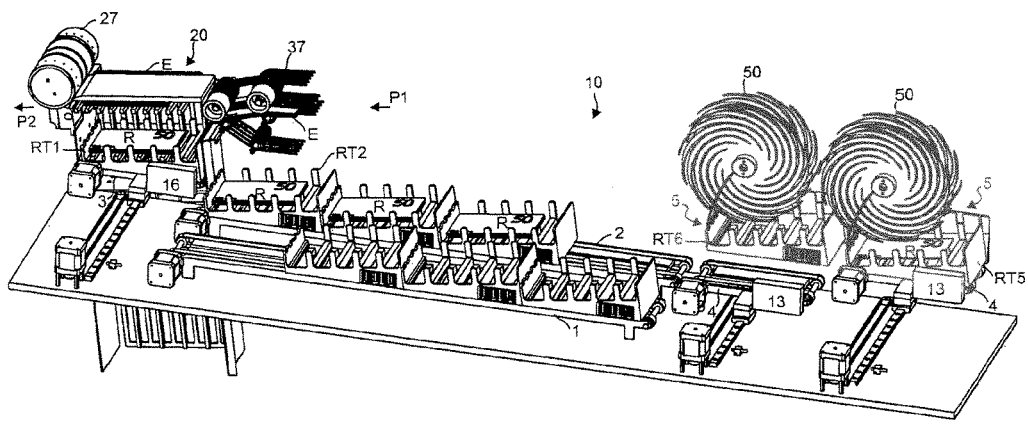

In a third exemplary embodiment, the value document processing apparatus has two reject deposit areas 5 which are used alternately for depositing reject value documents, in order to deposit reject value documents of different input stacks separately from each other, see FIG. 7a. Thus, a tandem operation of two equal reject deposit areas 5 is made possible. The reject transport device 10 is controlled therein such that at any time of the value document processing an RT is available for depositing reject value documents at least at one of the two reject deposit areas 5. It is thus ensured that also during the time while an RT loaded with reject value documents is transported out of one of the reject deposit areas and before an empty RT is transported into this reject deposit area again, an RT is available for depositing reject value documents at the other reject deposit area. In the FIGS. 7a-j, the chronological sequence of this tandem operation is illustrated FIG. 7a shows a time at which one RT each is available at both reject deposit areas 5. At the time shown, value documents of an input stack E are being singled in the input pocket 20, which are brought to the singling device with the rake 21. The reject value documents from this input stack E are transported into the right reject deposit area and deposited on the RT 5 made available there. At the time of the FIG. 7b, the depositing of the reject value documents on the RT 5, which was disposed in the right reject deposit area, has just been finished, and RT 5 has been driven out of the right reject deposit area 5 to the front with the aid of the conveyor belt 4 of the right reject deposit area. The RT 6 in the left reject deposit area is assuming the role of active reject deposit area. The completely loaded RT 5 is driven to the left by the right conveyor belt 4, taken over by the left conveyor belt 4 and driven by the same onto the second conveyor belt 2, to be transported in the direction of the input pocket 20, see FIGS. 7b-d. During this time, the right reject deposit area is no longer available for depositing reject value documents. To allow for the continuation of value document processing of a further input stack or reject stack R also during this time, the reject value documents occurring during this time are collected in the RT 6 made available in the left reject deposit area. While the next empty RT (RT 7) is transported into the right reject deposit area 5, see FIGS. 7d-f, the rejects occurring in the meantime are deposited in the RT 6.

At the end of the first and second conveyor belt 1, 2, a stopping mechanism is attached in each case, e.g. a vertically displaceable pin between the transport belt 8 of the first 1 and/or second conveyor belt 2 (pin not shown), the displacement of which is controlled by the transport control 12. In the vertically upper position, the pin restrains the RT disposed at the end of the conveyor belt in question, such that said RT is not transported further—despite a movement of the corresponding conveyor belt 1, 2. By the movement of the conveyor belt 1, 2 the further RTs are transported up to the RT held in place with the aid of the stopping mechanism until they abut said RT and are also stopped thereby. Thus a kind of queue is formed of the RTs loaded with reject value documents. When the RT disposed at the end of the conveyor belt 1 or 2 is intended to be transferred to the fourth or third conveyor belt, the transport control 12 causes the vertical pin to be withdrawn downward, and the next RT is let pass. After this next RT the pin is raised again in order to reactivate the stopping mechanism for stopping the subsequent RT.

Figure 7B:
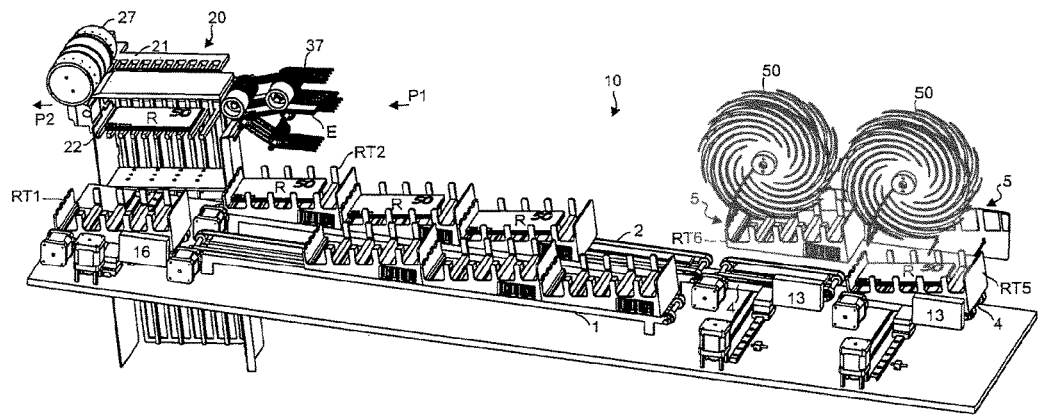
Figure 7C:
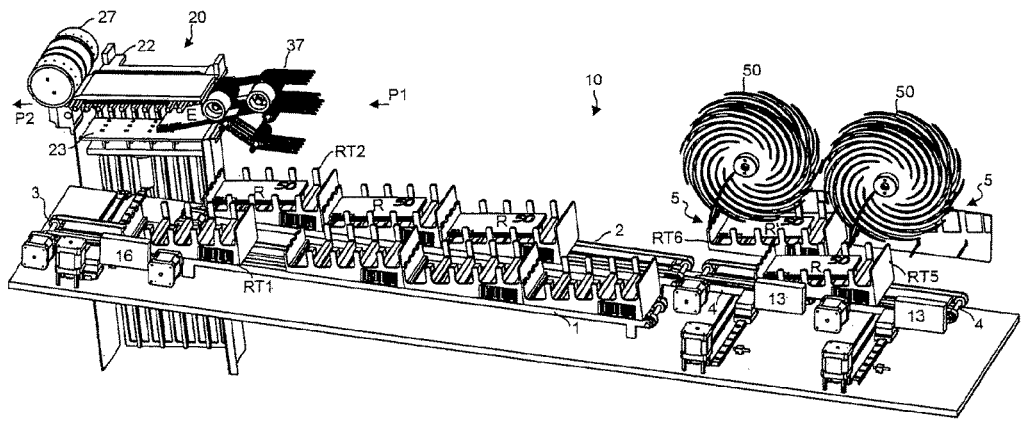
Figure 7D:
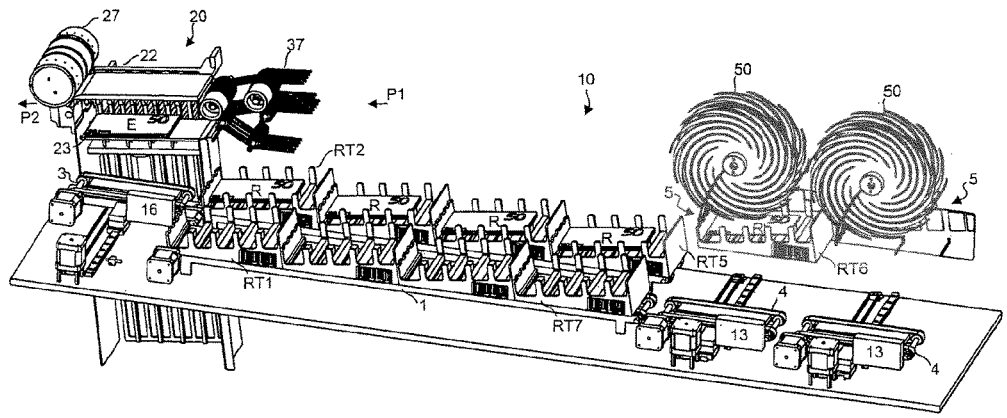
Figure 7E:
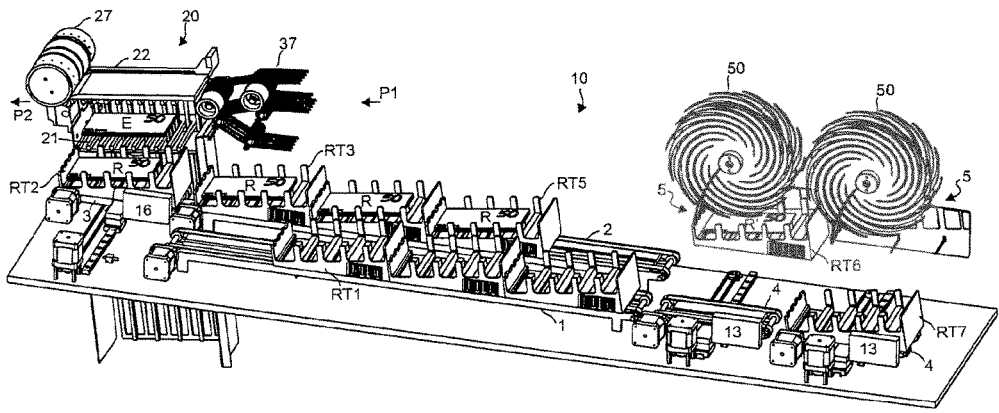
Figure 7F:
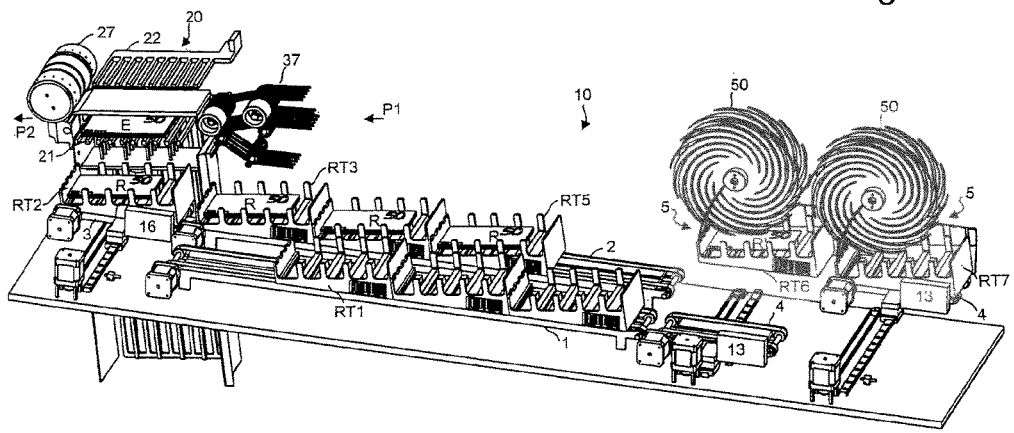

Once the RT 6 is made available in the left reject deposit area 5, the re-singling of the reject value documents of RT 1, which was transported into the input pocket 20, can be started, see FIGS. 7a-c (rerun). The RT 1 disposed in the input pocket 20 in FIG. 7a has already been emptied in FIG. 7c and transported onto the first conveyor belt 1. From the RT 1 the reject value documents are lifted by means of the rake 22, see FIGS. 3a-c. After the last reject value document of the input stack E was singled, the rake 21 is pulled backwards (see FIG. 7b) and driven downward to be used there for raising the next input stack E, see FIGS. 7e-g. This next input stack E is pushed onto the deposit plate 23 by the stack transport device 37 and raised by means of the pins 26 so that the rake 21 can be driven under the input stack, see FIGS. 7c-f and FIG. 4. The reject value documents R of the input stack E, which in the FIGS. 7c-g is inserted in the input pocket 20 and singled from there, are deposited in the RT 7 made available in the right reject deposit area, see FIGS. 7f-h. The reject value documents R' deposited in the RT 6 have already undergone a first rerun and are transported back to the input pocket 20 in the RT 6 for the second rerun.

Figure 7G:
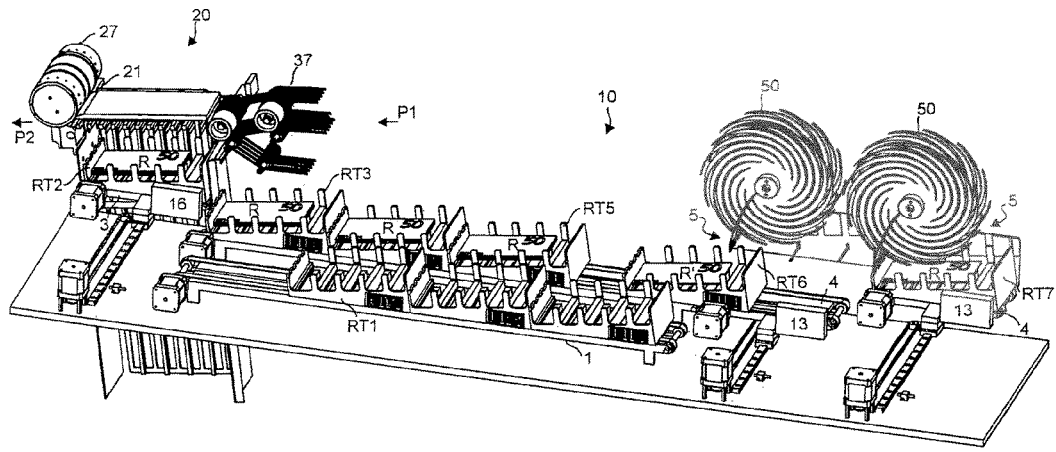
Figure 7H:
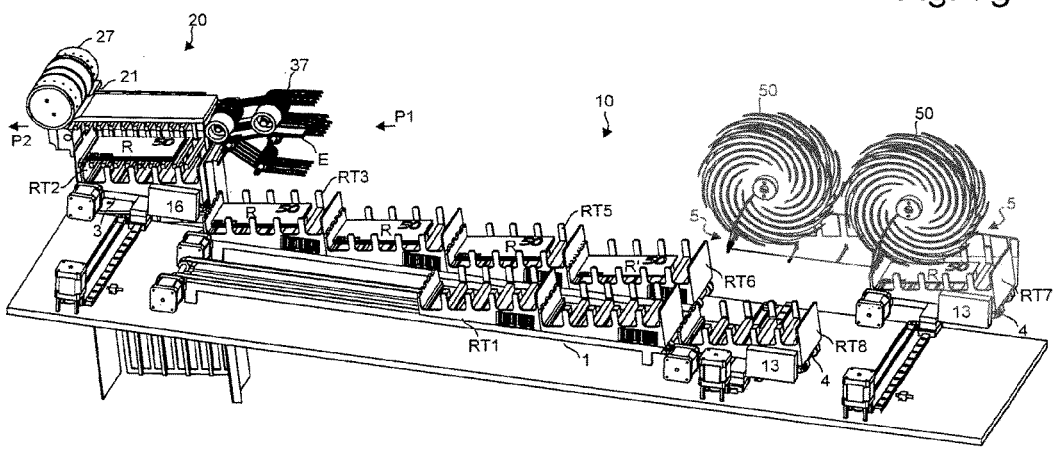

Once the RT 6 in the left reject deposit area is 5 has been completely loaded, the RT 6 is transported forward from the left reject deposit area 5 with the aid of the left conveyor belt 4 and is likewise transported onto the conveyor belt 2 in the direction of the input pocket 20, see FIGS. 7g-h. Once the left conveyor belt 4 is free, it is driven to the end of the front conveyor belt 1, where the empty RT 8 is transported from the conveyor belt 1 to the left conveyor belt 4 and into the left reject deposit area 5 by means of said conveyor belt 4, see FIGS. 7h-i. In the RT 8, the reject value documents R' are deposited that were transported back to the input pocket by means of the RT 2. These reject value documents R' are reject value documents R' that have already been checked for a second time (first rerun), and which are transported back to the input pocket 20 a second time, in order to be checked by the apparatus 100 for a third time (second rerun).

Figure 7I:
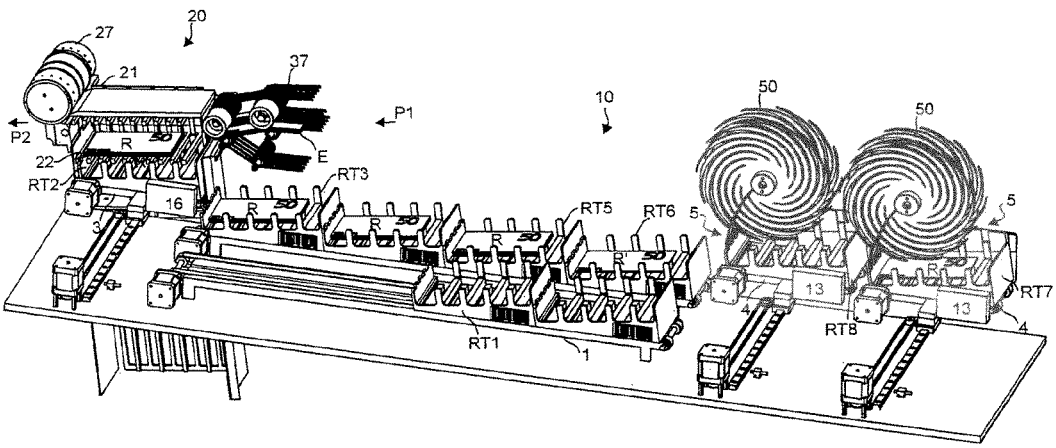
Figure 7J:
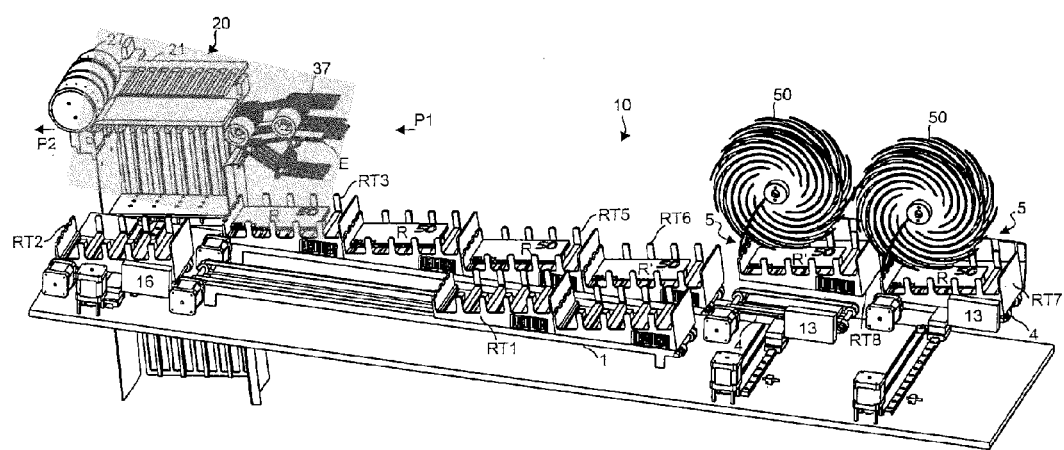

It can be seen in FIG. 7j that the left conveyor belt 4, which was still disposed below the left reject stacker wheel 50 in FIG. 7i, has driven out of the region of the left reject deposit area 5 to the front, but the RT 8 has remained below the left stacker wheel 50. The RT 8, disposed in the left reject deposit area, was lifted off the left conveyor belt 4 for this purpose with the aid of a lifting mechanism, see FIGS. 8a-c. For the lifting mechanism, two pins 17 project from the back panel of the reject deposit area 5, which, upon transporting the RT 8 inside by means of the conveyor belt 4, are pushed into corresponding holes 18 of the RT 8 (see FIG. 3c), see FIGS. 8a-b. Subsequently, the two pins 17 are moved upward to lift the RT 8 off the conveyor belt 4, see FIG. 8c. In this lifted position the reject value documents can be deposited on the RT 8 from the stacker wheel 50. The left conveyor belt 4 can be used in the meantime for transporting the RT 7 loaded with reject value documents (coming from the right reject deposit area 5), in order to convey said RT 7 from the right conveyor belt 4 onto the conveyor belt 2 in the direction of the input pocket 20 (analogous to FIGS. 7*b-d*).

In FIG. 6, a fourth exemplary embodiment is shown, which is based on the third exemplary embodiment, but has a third reject deposit area 5 in addition. The reject value documents deposited in the right reject deposit area are transported into a temporary reservoir 110, as described in connection with FIG. 5. The two left reject deposit area 5 are used for the tandem operation analogous to FIGS. 7*a-j*.

The invention claimed is:

1. A method for processing value documents with the aid of a value document processing apparatus, comprising the steps of:
   a) inserting one or several input stacks of value documents in an input pocket of the value document processing apparatus;
   b) singling the value documents from the input pocket by singling device of the value document processing apparatus;
   c) initial checking of the value documents by at least one sensor of the value document processing apparatus;
   d) transporting the value documents in dependence on results of the check and sorting the value documents in different deposit pockets of the value document processing apparatus, wherein reject value documents are separated from the valid value documents and deposited in a reject deposit area;
   e) transporting the reject value documents back from the reject deposit area to the input pocket with the aid of a reject transport device and re-inserting the reject value documents in the input pocket;
   f) repeating steps b)-d) to check the reject value documents again,
   wherein
   the reject transport device has several reject transport units, which each have an individual machine-readable identifier;
   the reject value documents of the different input stacks are deposited separately from each other in different reject transport units and are transported back to the input pocket of the value document processing apparatus in the different reject transport units;
   the reject transport device has a reader for reading the machine-readable identifier of the reject transport units;
   the machine-readable identifier of the respective reject transport unit read by the reader is used for assigning the reject value documents of the respective reject transport unit to the input stack to which these reject value documents belong.

2. The method according to claim 1, wherein, by moving the reject transport device, respectively one of the reject transport units is temporarily positioned in the reject deposit area of the value document processing apparatus, such that the reject value documents can be deposited directly from the value document processing apparatus in the reject transport unit.

3. The method according to claim 1, wherein the reader is so arranged on the reject transport device that it can read out the machine-readable identifier of the reject transport units during the loading of the reject transport units in the reject deposit area.

4. The method according to claim 1, wherein the reject value documents of the reject transport units transported back to the input pocket are automatically re-inserted in the input pocket and the respective reject transport unit is emptied thereby, and that the emptied reject transport unit is transported back to a reject deposit area with the aid of the reject transport device and is again made available there for receiving reject value documents.

5. The method according to claim 1, wherein the re-insertion of the reject value documents from the reject transport units in the input pocket is carried out at such an early stage that in the reject transport device there is at least one empty reject transport unit available at any given time of the value document processing for receiving reject value documents of the currently processed input stack, for example that the re-insertion of the reject value documents in the input pocket is caused at the latest when only one single empty reject transport unit remains present in the reject transport device.

6. The method according to claim 1, wherein the reject value documents of the reject transport units transported back to the input pocket are each re-inserted in the input pocket between two input stacks in such a fashion that an input stack is processed by the value document processing apparatus respectively immediately before the reject value documents of the respective transport unit and immediately after the reject value documents of the respective transport unit, but the reject value documents of two different reject transport units are not processed in immediate succession.

7. The method according to claim 1, wherein in the rerun of the reject value documents, a modified authenticity check of the reject value documents is carried out, in which the reject value documents are checked for authenticity less strictly than in the initial check.

8. The method according to claim 1, wherein in the input pocket at least one rake is provided which lifts the reject value documents from the respective reject transport unit and can raise them up to the singling device, so that the reject value documents are singled there again.

9. The method according to claim 1, wherein the reject transport units each have a meandering bottom on which the reject value documents can be deposited, wherein the meandering bottom is configured in such meandering fashion that a rake of the input pocket can dive into the meandering bottom, thereby diving below the reject value documents, in order to lift the reject value documents lying on the meandering bottom from the reject transport unit.

10. The method according to claim 1, wherein the reject transport device has two transport paths, which are formed in such a mutually separate fashion that they allow a closed circulation of the reject transport units from the reject deposit area to the input pocket and back again, wherein the reject transport units are transported along a first transport path from the region of the input pocket to the region of the reject deposit area and, after the reject value documents in the reject deposit area were deposited in the respective reject transport unit, are transported along a second transport path from the region of the reject deposit area to the region of the input pocket.

11. The method according to claim 1, wherein the reject transport device includes:
   a first transport device, which transports the empty reject transport units from the region of the input pocket to the region of the reject deposit area; and
   a second transport device, which transports reject transport units loaded with reject value documents from the region of the reject deposit area to the region of the input pocket; and
   a third transport device, which receives the reject transport units loaded with reject value documents at the end of the second transport device and transports them into the input pocket and transports the empty reject transport units out of the input pocket and up to the start of the first transport device; and a fourth transport device, which receives the empty reject transport units at the end of the first transport device and transports them into the reject deposit area and transports the reject transport units loaded with reject value documents out of the reject deposit area and up to the start of the second transport device.

12. The method according to claim 1, wherein the value document processing apparatus has two reject deposit areas, which are used alternately for depositing reject value documents which belong to value document stacks that are inserted consecutively in the input pocket, in particular input stacks and/or reject stacks, and that the reject transport device is controlled such that at any given time of the value document processing, there is one reject transport unit available at least at one of the reject deposit areas for depositing reject value documents.

13. The method according to claim 1, wherein the value document processing apparatus has at least two reject deposit areas, which are used for separately depositing reject value documents with different reject causes; and in the sorting of the value documents, the reject value documents of the respective value document stack, in particular input stack or reject stack, are divided into a first and a second reject category which are deposited in different ones of the reject deposit areas, wherein the first reject category includes the value documents which were not recognized in the check, and the second reject category includes the value documents suspected of forgery.

14. The method according to claim 13, wherein the reject value documents that are deposited in a reject transport unit in one of the reject deposit areas and transported back to the input pocket and re-inserted in the input pocket, are only the reject value documents of the first category, and that the reject value documents of the second category are deposited in a different reject deposit area and transported from there into a temporary reservoir, from which they can be removed at a later time to check their authenticity again.

15. An apparatus for processing value documents, comprising;

a) an input pocket for receiving one or several input stacks of value documents, which are inserted in the input pocket;

b) a singling device for singling the value documents from the input pocket;

c) at least one sensor for checking the value documents;

d) a transport system for transporting the value documents in dependence on results of the chock and sorting the value documents in different deposit pockets of the value document processing apparatus;

e) a reject transport device for automatically transporting reject value documents back from the reject deposit area to the input pocket;

f) a control device which controls the apparatus and the reject transport device, such that the reject value documents are deposited in a reject deposit area separately from the valid value documents, the reject value documents are transported back from the reject deposit area to the input pocket and re-inserted in the input pocket, and the reject value documents re-inserted in the input pocket are checked again by the apparatus;

wherein the reject transport device has several reject transport units, which each have an individual machine-readable identifier;

the reject transport device has a reader for reading the machine-readable identifier of the reject transport units;

the control device controls the reject transport device such that the reject value documents of the different input stacks are deposited in different reject transport units separately from each other, and are transported back to the input pocket of the value document processing apparatus in the different reject transport units;

an evaluation device, which uses the machine-readable identifier of the respective reject transport unit read by the reader for assigning the reject value documents from the respective reject transport unit to the input stack to which these reject value documents belong.

16. The method according to claim 1, wherein the first transport device, the second transport device, the third transport device, or the fourth transport device includes a conveyor belt.

* * * * *